United States Patent
Kim et al.

(10) Patent No.: US 10,864,835 B2
(45) Date of Patent: Dec. 15, 2020

(54) LEG REST HAVING DISTORTION PREVENTING FUNCTION

(71) Applicant: HYUNDAI TRANSYS INCORPORATED, Seosan-si (KR)

(72) Inventors: Jun Kyu Kim, Hwaseong-si (KR); Myeong Sub Kim, Hwaseong-si (KR); Gi Tae Jo, Hwaseong-si (KR); Yeon Min Choi, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/385,545

(22) Filed: Apr. 16, 2019

(65) Prior Publication Data

US 2019/0241108 A1    Aug. 8, 2019

Related U.S. Application Data

(63) Continuation of application No. PCT/KR2017/009287, filed on Aug. 24, 2017.

(30) Foreign Application Priority Data

Oct. 17, 2016    (KR) .......................... 10-2016-0134275

(51) Int. Cl.
   *B60N 2/90*    (2018.01)
   *B60N 3/06*    (2006.01)

(52) U.S. Cl.
   CPC ............. *B60N 2/995* (2018.02); *B60N 2/933* (2018.02); *B60N 3/063* (2013.01)

(58) Field of Classification Search
   CPC ...... B60N 2/995; A47C 7/5066; A47C 7/5068
   See application file for complete search history.

(56) References Cited

U.S. PATENT DOCUMENTS

| 2007/0289063 A1* | 12/2007 | Martin ................... A61G 5/128 5/618 |
| 2010/0244534 A1* | 9/2010 | Driessen ................ B60N 2/995 297/423.35 |

(Continued)

FOREIGN PATENT DOCUMENTS

| DE | 102015107988 A1 * | 11/2016 | ............. B60N 2/995 |
| EP | 1564139 A2 * | 8/2005 | ........... B64D 11/064 |

(Continued)

OTHER PUBLICATIONS

International Search Report for International patent application PCT/KR2017/009287, dated Dec. 5, 2017.

*Primary Examiner* — Timothy J Brindley
(74) *Attorney, Agent, or Firm* — Burris Law, PLLC

(57) ABSTRACT

A leg rest having a distortion preventing function, according to the present disclosure, includes: a fixed bracket fixedly provided at the front of the lower end of a vehicle seat frame; a rotating bracket provided at the front of the fixed bracket so as to be rotatable in a vertical direction; a driving unit connected to the lower surface of the rotating bracket so as to rotate the rotating bracket; a tilting unit respectively supporting both sides of the rotating bracket so as to intermediate between the fixed bracket and the rotating bracket, and tilting the rotating bracket in the longitudinal direction of the fixed bracket; and a link bracket intermediating between the driving unit and the tilting unit so as to prevent horizontal distortion when the rotating bracket rotates.

7 Claims, 5 Drawing Sheets

(56) References Cited

U.S. PATENT DOCUMENTS

| | | | | |
|---|---|---|---|---|
| 2011/0215200 A1* | 9/2011 | Mejuhas | ............ | B64D 11/0643 |
| | | | | 244/118.6 |
| 2014/0021765 A1* | 1/2014 | Suzuki | .................. | B60N 2/995 |
| | | | | 297/423.19 |
| 2016/0331609 A1* | 11/2016 | Cheng | .................... | A61G 5/127 |
| 2019/0322202 A1* | 10/2019 | Hur | ........................ | B60N 2/995 |
| 2019/0365107 A1* | 12/2019 | Last | ..................... | A47C 7/5068 |

FOREIGN PATENT DOCUMENTS

| | | | | | |
|---|---|---|---|---|---|
| EP | 2583898 | A2 | * | 4/2013 | ............. B60N 2/995 |
| FR | 3064555 | A1 | * | 10/2018 | ......... B64D 11/0643 |
| JP | H11332688 | | | 12/1999 | |
| JP | 2006198104 | | | 8/2006 | |
| JP | 2009066180 | A | * | 4/2009 | ........... B60N 2/0232 |
| JP | 2014004325 | A | * | 1/2014 | ............. B64D 11/06 |
| JP | 5414263 | | | 2/2014 | |
| KR | 1020110137995 | | | 12/2011 | |
| KR | 1020120045648 | | | 5/2012 | |
| KR | 1020130073221 | | | 7/2013 | |
| KR | 1020160005274 | | | 1/2016 | |
| WO | WO-2006011244 | A1 | * | 2/2006 | ............. B60N 2/995 |
| WO | WO-2016013787 | A1 | * | 1/2016 | ........... B60N 2/0232 |
| WO | WO-2017153004 | A1 | * | 9/2017 | ............. A47C 7/506 |

* cited by examiner

[Fig.1]
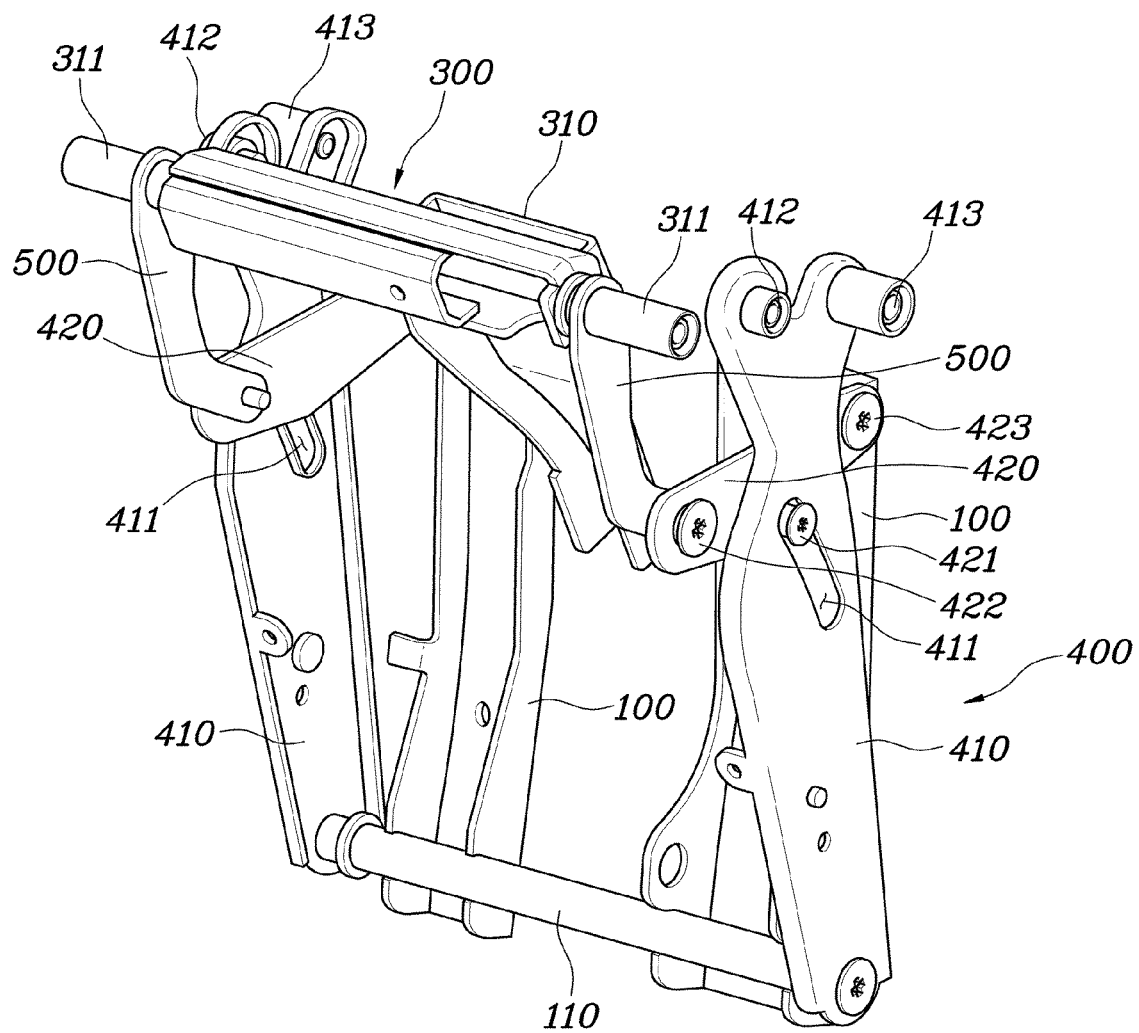

[Fig.2]
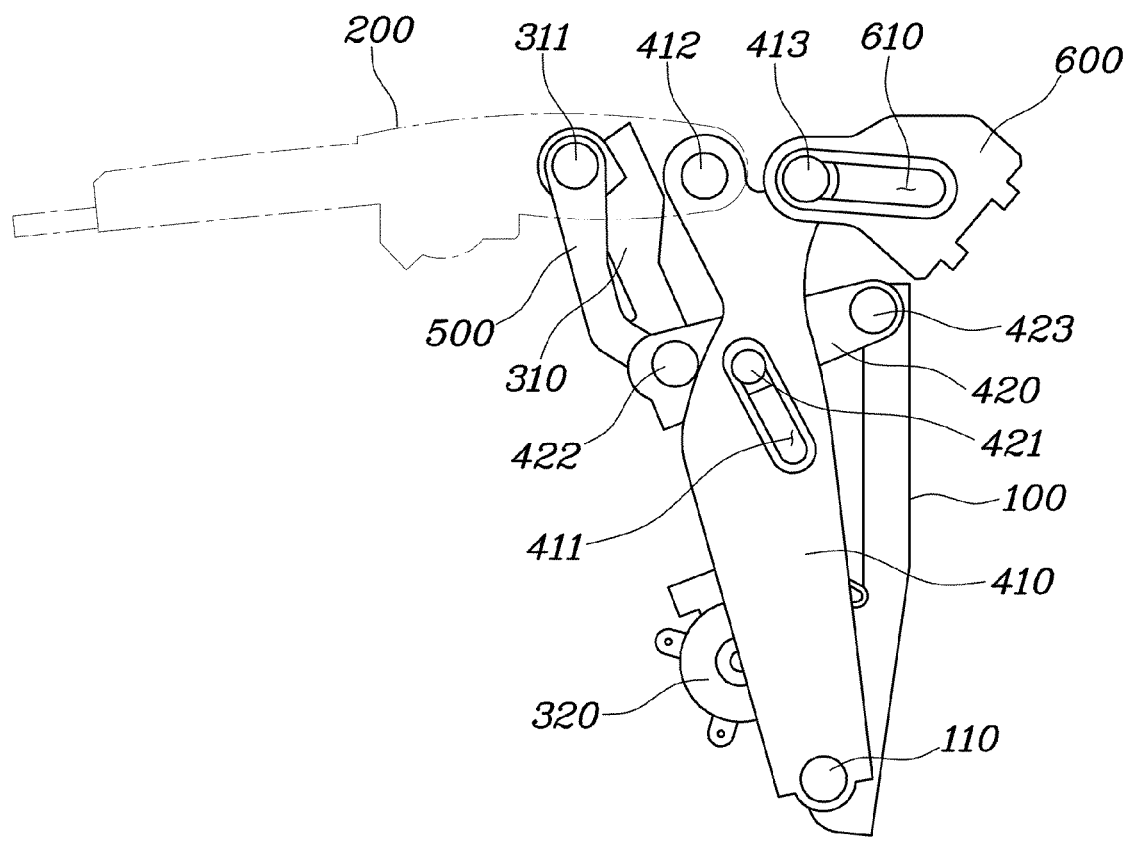

[Fig.3]
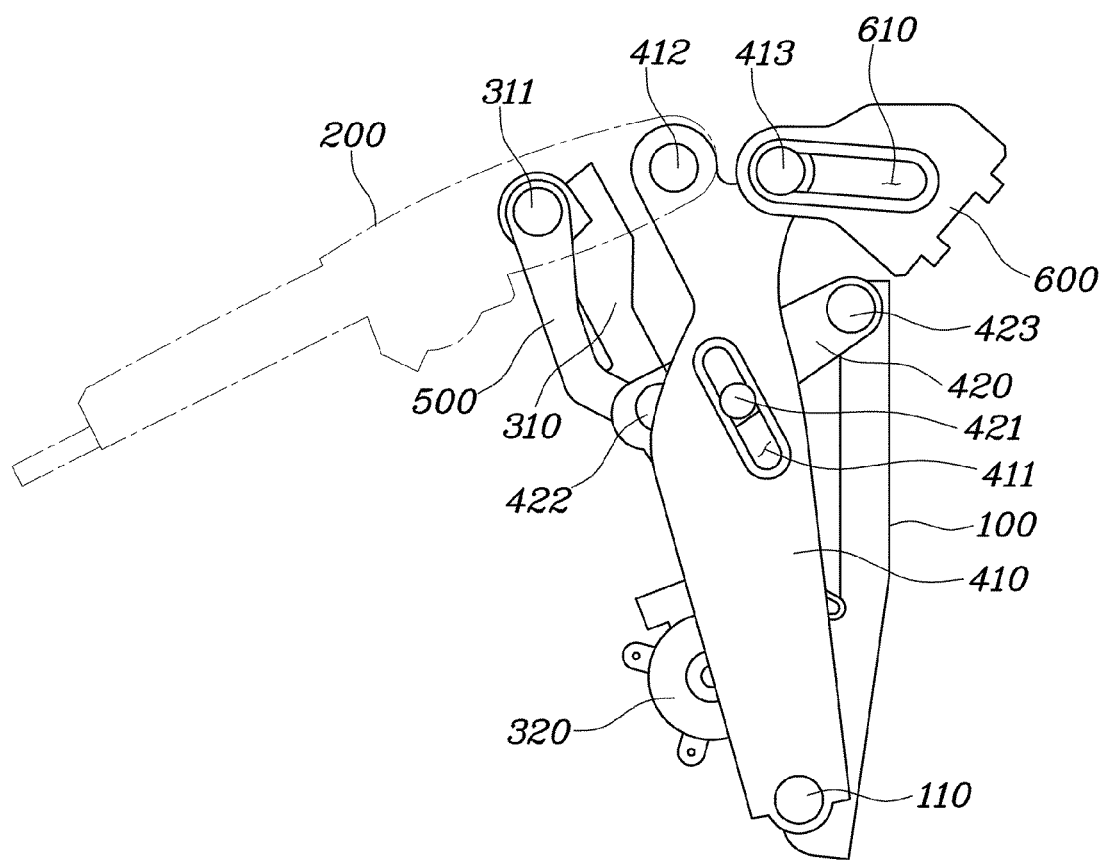

[Fig.4]
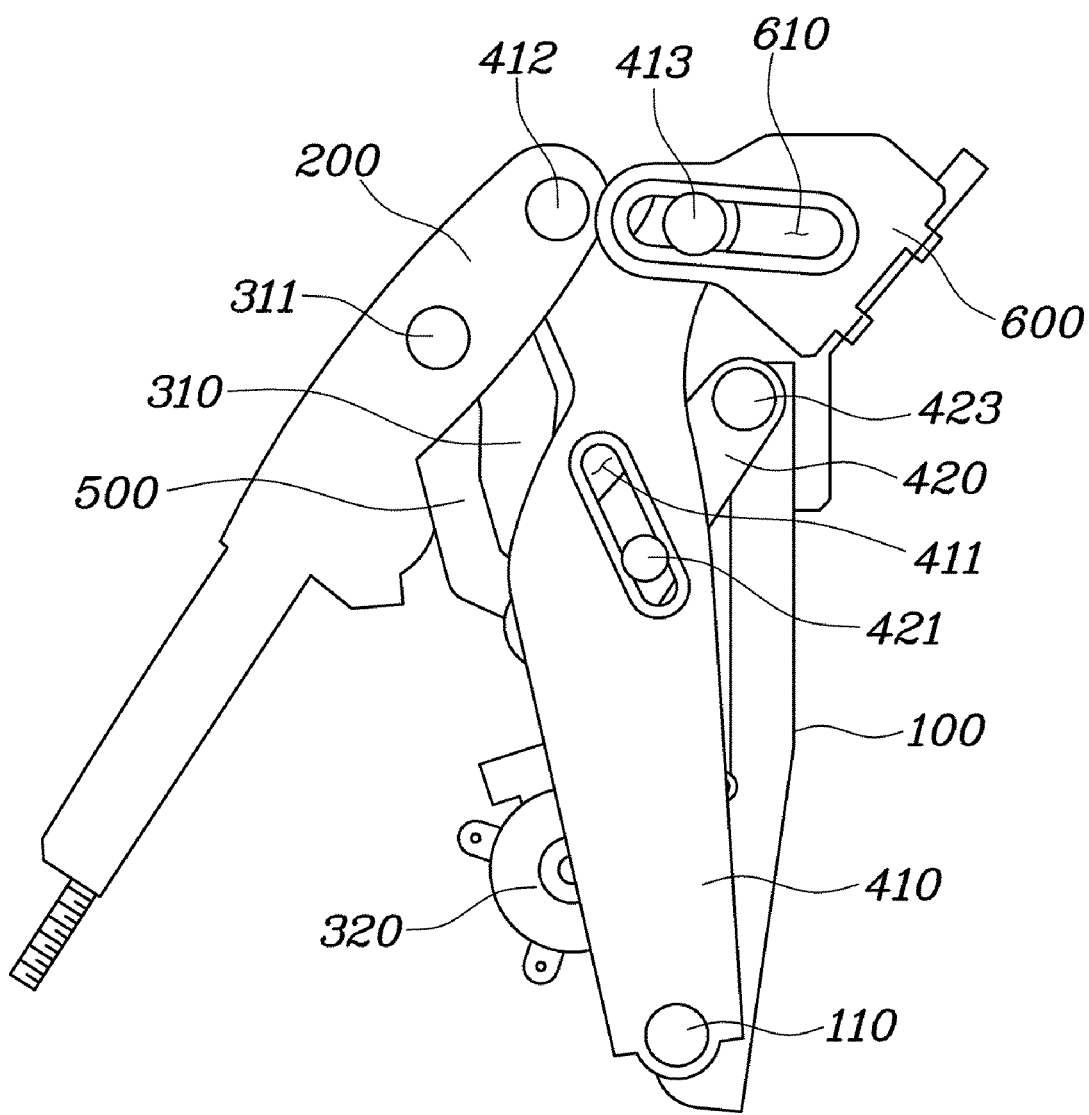

[Fig.5]
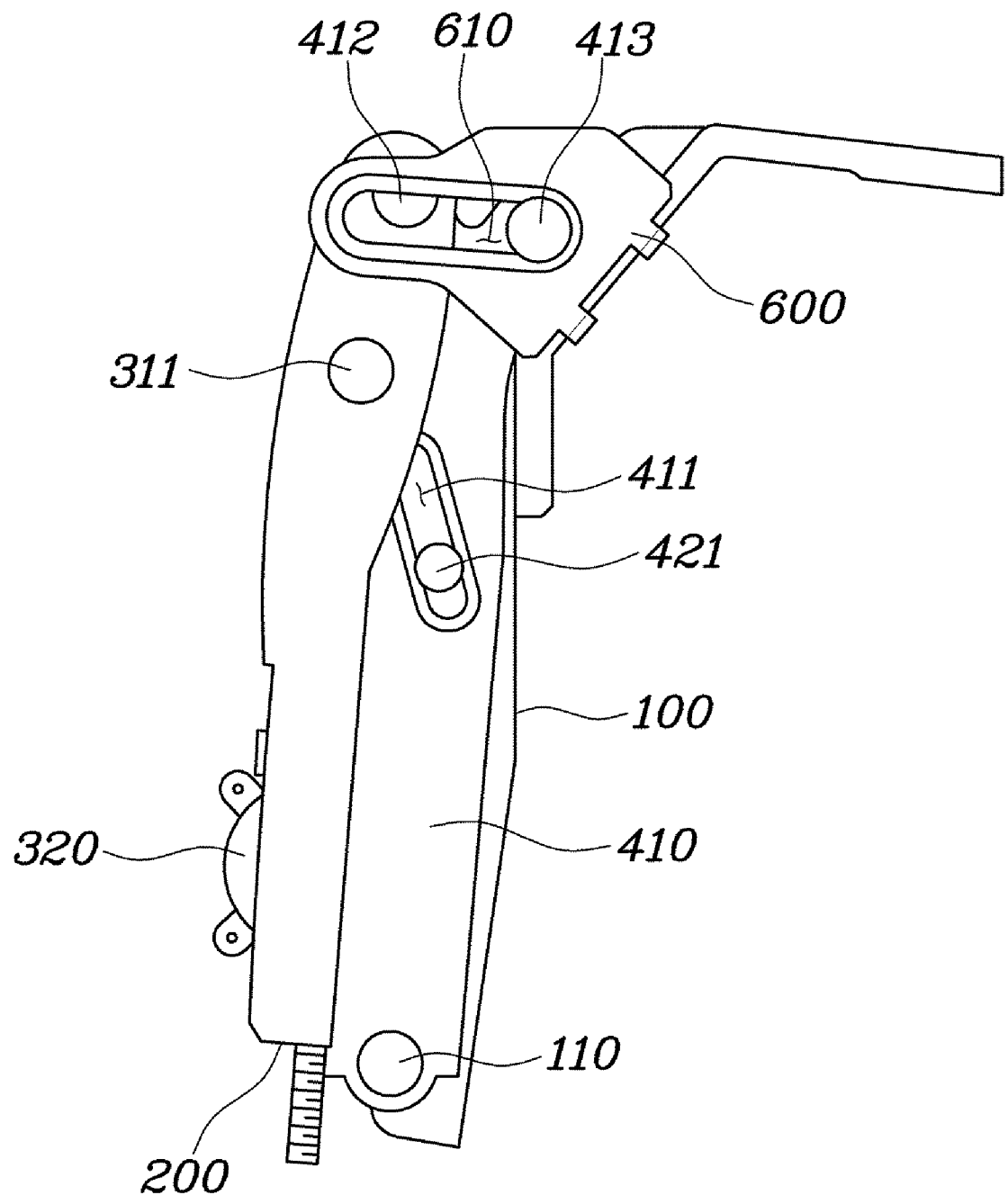

LEG REST HAVING DISTORTION PREVENTING FUNCTION

CROSS-REFERENCE TO RELATED APPLICATIONS

This application is a continuation of International Application No. PCT/KR2017/009287, filed on Aug. 24, 2017, which claims priority to and the benefit of KR 1020160134275 filed on Oct. 17, 2016. The disclosures of the above applications are incorporated herein by reference.

FIELD

The present disclosure relates to a leg rest having a distortion preventing function. More particularly, the present disclosure relates to a leg rest having a distortion preventing function, the leg rest provided at a front of a lower portion of a vehicle seat.

BACKGROUND

The statements in this section merely provide background information related to the present disclosure and may not constitute prior art.

In general, a seat is provided inside a vehicle so that an occupant can comfortably ride on the seat. The seat includes a seat cushion for supporting a hip portion of an occupant and a seatback for supporting the occupant's back and waist.

Further, various convenience devices are installed on the seat for comfort and convenience of the occupant. Among these convenience devices, a leg rest supporting the occupant's calf portion is installed to support the occupant's back, waist, buttocks, and legs seated on the seat.

Since the physical conditions of occupants are very diverse, the rotation angle of the leg rest should be freely set so that the leg rest can be brought into close contact with the occupant's leg and support the same regardless of the physical condition such as occupant's leg length.

However, when the conventional leg rest is stopped at an intermediate angle in the folded-unfolded state, horizontal distortion or deflection may occur.

Accordingly, there is a need for a new leg rest structure in which horizontal distortion of the leg rest is prevented regardless of the rotation angle.

The foregoing is intended merely to aid in the understanding of the background of the present disclosure, and is not intended to mean that the present disclosure falls within the purview of the related art that is already known to those skilled in the art.

SUMMARY

Technical Problem

Accordingly, the present disclosure has been made keeping in mind the above problems occurring in the prior art, and an object of the present disclosure is to provide a leg rest having a distortion preventing function, in which horizontal distortion and deflection phenomenon are prevented when the leg rest is folded or unfolded.

Technical Solution

In order to accomplish the above object, a leg rest having a distortion preventing function according to a form of the present disclosure includes: a fixed bracket fixedly provided at a front of a lower end of a vehicle seat frame; a rotating bracket provided at a front of the fixed bracket to be rotatable in a vertical direction; a driving unit connected to a lower surface of the rotating bracket to rotate the rotating bracket; a tilting unit respectively supporting opposite sides of the rotating bracket to intermediate between the fixed bracket and the rotating bracket, and tilting the rotating bracket in forward and backward directions of the fixed bracket; and a link bracket intermediating between the driving unit and the tilting unit to prevent horizontal distortion when the rotating bracket is rotated.

The fixed bracket may be provided as one pair arranged in parallel in left and right directions while being spaced apart from each other, the tilting unit may include a pair of side brackets configured such that lower ends thereof are rotatably coupled to lower ends of the pair of fixed brackets, and upper ends thereof are rotatably coupled to the opposite sides of the rotating bracket; and a pair of tilting brackets configured such that first ends thereof are rotatably coupled to upper ends of the pair of fixed brackets respectively to rotate the pair of side brackets in the forward and backward directions according to a rotation angle, the driving unit may include a lifting bracket provided with a lifting bracket shaft on each of opposite sides thereof to be rotatably coupled to the rotating bracket, and the link bracket may connect the lifting bracket shaft and a second end of the tilting bracket such that the pair of tilting brackets are rotated at an equal angle.

Each of the pair of tilting brackets may be configured such that a middle portion thereof is protrudingly provided with a guide protrusion, and each of the pair of side brackets may be configured such that a middle portion thereof is provided with a guide hole in which the guide protrusion is inserted, so as to be rotated in the forward and backward directions according to the rotation angle of the tilting bracket.

The driving unit may further include a lifting motor connected to a lower end of the lifting bracket to move the lifting bracket vertically, and the lifting bracket may be formed asymmetrically such that a connection portion with the driving unit is closer to one of the pair of tilting brackets, and is connected to the one of the tilting brackets closer to the connection portion via a first tilting bracket shaft.

The link bracket may be provided to connect the lifting bracket shaft provided on a first side of the lifting bracket with a second end of remaining one of the tilting brackets without being connected to the lifting bracket via the first tilting bracket shaft.

The link bracket may be additionally provided to connect the lifting bracket shaft provided on a second side of the lifting bracket with a second end of the tilting bracket connected with the lifting bracket via the first tilting bracket shaft.

In a state where the leg rest is deployed forwards, the link bracket may be configured such that a first end thereof is connected to the lifting bracket shaft, extends downwards, then is bent, and extends backwards, and a second end thereof is connected to a second end of the tilting bracket.

The guide hole may be formed to be inclined in a direction in which an upper end thereof is disposed further forward than a lower end thereof.

Advantageous Effects

The leg rest having a distortion preventing function according to the present disclosure has the following advantageous effects.

First, since the opposite sides of the leg rest are rotated at an equal angle while the leg rest is folded or unfolded, it is possible to prevent distortion and deflection.

Second, since the opposite sides of the leg rest are simultaneously moved forwards and backwards while the leg rest is tilted, it is possible to prevent distortion and deflection.

Third, the present disclosure is easily applicable to a conventional leg rest apparatus.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view showing a leg rest according to a form of the present disclosure; and FIGS. 2 to 5 are side views showing the rotation process of the leg rest according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular embodiments or forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, a leg rest having a distortion preventing function according to a form of the present disclosure will be described in detail with reference to the accompanying drawings.

As shown in FIGS. 1 and 2, a leg rest according to the present disclosure roughly includes a fixed bracket 100, a rotating bracket 200, a driving unit 300, a tilting unit 400, and a link bracket 500.

The fixed bracket 100 is fixedly provided at a front of a seat frame 600 to support the entire leg rest, and the rotating bracket 200 is provided at a front of the fixed bracket 100 to be rotatable in a vertical direction while forming the frame of a leg rest cushion (not shown).

The driving unit 300 is connected to a lower portion of the rotating bracket 200 to adjust a rotation angle of the rotating bracket 200, and the tilting unit 400 operates in conjunction with the rotation angle of the rotating bracket 200 to move the rotating bracket 200 in forward and backward directions.

Lastly, the link bracket 500 is a key component of the present disclosure, which constantly maintains the gap between the driving unit 300 and the tilting unit 400 according to the rotation angle of the rotating bracket 200 to prevent horizontal distortion.

Hereinafter, each configuration of the present disclosure described above will be described in more detail.

The fixed bracket 100 is connected to the seat frame 600 to be fixedly provided at the front of a lower portion of a seat, and serves to directly and indirectly support the rotating bracket 200, the driving unit 300, the tilting unit 400, and the link bracket 500, which will be described later.

The fixed bracket 100 is provided as one pair arranged in parallel in left and right directions, wherein the pair of fixed brackets 100 are spaced apart from each other so as not to interfere with the configuration for driving the seat and leg rest.

The rotating bracket 200, which is a part forming the frame of the leg rest cushion that is brought into contact with the occupant's calf, is provided at the front of the fixed bracket 100 to be rotatable in a vertical direction. Since the rotating bracket 200 is configured to be rotatable about the front end of the seat cushion, the leg rest cushion can be brought into close contact with the part below the occupant's knee.

The driving unit 300 includes: a lifting bracket 310 rotatably coupled to a lower end of the rotating bracket 200; a lifting motor 320 connected to a lower portion of the lifting bracket 310 to move the lifting bracket 310 vertically.

The lifting bracket 310 is rotatably coupled to a point separate from the rotation axis of the rotating bracket 200 and, more particularly, coupled to a position in front of the rotation axis of the rotating bracket 200. Accordingly, when the lifting bracket 310 is moved up and down by the lifting motor 320, the rotating bracket 200 can be rotated up and down about the rotation axis by the force.

The lifting bracket 310 is provided with a lifting bracket shaft 311 on each of opposite sides thereof to be rotatably coupled to the rotating bracket 200. Further, the lifting bracket 310 is formed with a connection portion at a lower end thereof connected with the lifting motor 320, wherein the connection portion is formed eccentrically in one direction rather than the center of the lifting bracket 310. This is because a separate seat member is provided at the lower center portion of the lifting bracket 310, so that the corresponding space is left empty. The side of the eccentric connection portion is rotatably coupled to one of tilting brackets 420 of the tilting unit 400, which will be described in more detail in the description of the tilting unit 400.

The tilting unit 400 includes: a pair of side brackets 410 rotatably coupled to the lower end of the fixed bracket 100; and the tilting brackets 420 connecting the fixed bracket 100 and the lifting bracket 310 through a link structure.

The side bracket 410 is provided in each fixed bracket 100, wherein the lower end of the fixed bracket 100 and the lower end of the side bracket 410 are rotatably coupled to each other. Here, the side brackets 410 are rotated about a support rod 110 connecting the pair of fixed brackets 100.

The side bracket 410 is protrudingly formed with a first side bracket shaft 412 and a second side bracket shaft 413 at the upper end thereof, and is formed with a guide hole 411 at the middle portion thereof. The first side bracket shaft 412 is coupled to the rotating bracket 200 to form the rotation axis of the rotating bracket 200, and the second side bracket shaft 413 is inserted into a seat frame hole 610 formed in the seat frame 600 to limit the forward and backward moving distance of the tilting unit 400.

The guide hole 411, into which a guide protrusion 421 formed in the tilting bracket 420 is inserted, is a part for rotating the side bracket 410 in the forward and backward directions according to the rotation angle of the tilting bracket 420. As shown in FIG. 2, the guide hole 411 may be formed to incline in a direction in which an upper end of the guide hole 411 is disposed further forward than a lower end of the guide hole 411. By such configuration, the guide hole 411 may rotate the side bracket 410 in the forward and backward directions.

The tilting bracket 420 is provided on each of opposite sides of the fixed bracket 100 to connect three parts, that is, the upper portion of the fixed bracket 100, the side bracket 410, and the lifting bracket 310, wherein the tilting bracket 420 on the first side is configured such that opposite ends thereof are connected with the fixed bracket 100 and the lifting bracket 310, respectively, and the tilting bracket 420 on the second side is configured such that the first end thereof is connected with the fixed bracket 100.

In the case of the tilting bracket 420 on the first side, the first end thereof is coupled to the lifting bracket 310 to be rotatable about a first tilting bracket shaft 422, the second end thereof is coupled to the fixed bracket 100 to be rotatable about a second tilting bracket shaft 423, and the guide protrusion 421 formed at the middle portion thereof is inserted into the guide hole 411 of the side bracket 410.

In the case of the tilting bracket 420 on the second side, the second end thereof is coupled to the fixed bracket 100 to be rotatable about the second tilting bracket shaft 423, and the guide protrusion 421 formed at the middle portion thereof is inserted into the guide hole 411 of the side bracket 410.

In other words, of the pair of tilting brackets 420, only the tilting bracket 420 on the first side disposed close to the connection portion of the lifting bracket 310 is connected with the lifting bracket 310, and the tilting bracket 420 on the second side disposed far from the connection portion is not connected with the lifting bracket 310.

The link bracket 500 is a part for connecting the lifting bracket shaft 311 and the tilting bracket 420 such that the pair of tilting brackets 420 are rotated at an equal angle.

In other words, conventionally, one of the pair of tilting brackets 420 is not directly connected with the lifting bracket 310, which makes the supporting force weak, and as a result, horizontal distortion occurs. To solve this problem, the separate link bracket 500 connecting the lifting bracket shaft 311 and the tilting brackets 420 is additionally provided to prevent horizontal distortion and deflection phenomenon.

In particular, it is preferable that the link bracket is provided to connect the tilting bracket 420 on the second side without being directly connected with the lifting bracket 310 and the lifting bracket shaft 311 together. Thereby, it is possible to connect the lifting bracket 310 and the tilting bracket 420, which are spaced apart from each other without being supported, and is possible to transfer the force between these two configurations.

Herein, when the link bracket 500 is additionally provided at the tilting bracket 420 on the first side directly connected with the lifting bracket 310, the horizontal distortion is reduced, and thus, the rotational operation of the leg rest can be performed more stably.

Meanwhile, in the state where the leg rest is deployed forwards as shown in FIG. 2, the link bracket 500 is configured such that a first end thereof is connected to the lifting bracket shaft 311, downwards, then is bent, and extends backwards, and a second end thereof is connected to a second end of the tilting bracket 420. In this way, the position of the lifting bracket shaft 311 can be stably supported in the state where the leg rest is deployed forwards or in the middle of deployment, and it is possible to prevent collision with the guide protrusion 421 in the state where the leg rest is accommodated rearwards as shown in FIG. 5, and thus, the leg rest becomes more compact when accommodated.

Hereinafter, the operation process of leg rest according to present disclosure will be described.

FIGS. 2 to 5 sequentially show the converting processes from the unfolded state to the folded state.

As shown in FIG. 2, when the leg rest is in the unfolded state, the lifting bracket 310 is maximally raised to rotate the rotating bracket 200 to the maximum height to maintain the angle of the leg rest at the maximum, and the side brackets 410 are rotated forward to tilt the rotating bracket 200 in the forward direction.

Here, the second side bracket shaft 413 formed at the side bracket 410 is engaged with the seat frame hole 610 of the seat frame 600 to limit the forward tilting distance, and the guide protrusion 421 formed at the tilting bracket 420 is engaged with the guide hole 411 formed in the side bracket 410 to limit the elevation angle of the tilting bracket 420.

As shown in FIGS. 3 and 4, as the lifting bracket 310 is moved down, the rotating bracket 200 is rotated downwards, and thus, the tilting bracket 420 is rotated downwards and the side bracket 410 is rotated backwards, thereby retracting the rotating bracket 200.

As shown in FIG. 5, when the folding is complete, the side bracket 410 is fully retracted such that the second side bracket shaft 413 is brought into contact with the rear end of the seat frame hole 610, and the rotating bracket 200 and the tilting brackets 420 are arranged almost perpendicular to each other such that the leg rest is accommodated under the seat.

Although one form of the present disclosure has been described disclosed with reference to the accompanying drawings, those who are ordinarily skilled in the art will appreciate that various alternatives, modifications, and equivalents are possible, without changing the spirit or essential features of the present disclosure.

Therefore, one form of the present disclosure has been described for illustrative purposes, and should not be construed as being restrictive. The scope of the present disclosure is defined by the accompanying claims rather than the description which is presented above. Moreover, the present disclosure is intended to cover not only the disclosed forms, but also various alternatives, modifications, equivalents, forms, and other embodiments that may be included within the spirit and scope of the present disclosure as defined by the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A leg rest having a distortion preventing function, the leg rest comprising:
    a fixed bracket fixedly provided at a front of a lower end of a vehicle seat frame;
    a rotating bracket provided at a front of the fixed bracket to be rotatable in a vertical direction;
    a driving unit connected to a lower surface of the rotating bracket to rotate the rotating bracket;
    a tilting unit respectively supporting opposite sides of the rotating bracket to intermediate between the fixed bracket and the rotating bracket, and tilting the rotating bracket in forward and backward directions of the fixed bracket; and
    a link bracket intermediating between the driving unit and the tilting unit to prevent horizontal distortion when the rotating bracket is rotated,
    wherein the fixed bracket is provided as one pair arranged in parallel in left and right directions while being spaced apart from each other,
    the tilting unit includes: a pair of side brackets configured such that lower ends thereof are rotatably coupled to lower ends of the pair of fixed brackets, and upper ends thereof are rotatably coupled to the opposite sides of the rotating bracket; and a pair of tilting brackets configured such that first ends thereof are rotatably coupled to upper ends of the pair of fixed brackets respectively to rotate the pair of side brackets in the forward and backward directions according to a rotation angle,
    the driving unit includes a lifting bracket provided with a lifting bracket shaft on each of opposite sides thereof to be rotatably coupled to the rotating bracket, and
    the link bracket connects the lifting bracket shaft and a second end of the tilting bracket such that the pair of tilting brackets are rotated at an equal angle.

2. The leg rest of claim 1, wherein each of the pair of tilting brackets is configured such that a middle portion thereof is protrudingly provided with a guide protrusion, and
    each of the pair of side brackets is configured such that a middle portion thereof is provided with a guide hole in which the guide protrusion is inserted, so as to be rotated in the forward and backward directions according to the rotation angle of the tilting bracket.

3. The leg rest of claim 1, wherein the driving unit further includes a lifting motor connected to a lower end of the lifting bracket to move the lifting bracket vertically, and
    the lifting bracket is formed asymmetrically such that a connection portion with the driving unit is closer to one of the pair of tilting brackets, and is connected to the one of the tilting brackets closer to the connection portion via a first tilting bracket shaft.

4. The leg rest of claim 3, wherein the link bracket is provided to connect the lifting bracket shaft provided on a first side of the lifting bracket with a second end of remaining one of the tilting brackets without being connected to the lifting bracket via the first tilting bracket shaft.

5. The leg rest of claim 4, wherein the link bracket is additionally provided to connect the lifting bracket shaft provided on a second side of the lifting bracket with a second end of the tilting bracket connected with the lifting bracket via the first tilting bracket shaft.

6. The leg rest of claim 1, wherein in a state where the leg rest is deployed forwards, the link bracket is configured such that a first end thereof is connected to the lifting bracket shaft, extends downwards, then is bent, and extends backwards, and a second end thereof is connected to a second end of the tilting bracket.

7. The leg rest of claim 2, wherein the guide hole is formed to be inclined in a direction in which an upper end thereof is disposed further forward than a lower end thereof.

\* \* \* \* \*